(12) United States Patent
Itoh et al.

(10) Patent No.: US 10,540,963 B2
(45) Date of Patent: Jan. 21, 2020

(54) INPUT GENERATION FOR CLASSIFIER

(71) Applicant: INTERNATIONAL BUSINESS MACHINES CORPORATION, Armonk, NY (US)

(72) Inventors: Nobuyasu Itoh, Tokyo (JP); Gakuto Kurata, Tokyo (JP); Ryuki Tachibana, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 62 days.

(21) Appl. No.: 15/422,507

(22) Filed: Feb. 2, 2017

(65) Prior Publication Data

US 2018/0218736 A1    Aug. 2, 2018

(51) Int. Cl.

| | |
|---|---|
| *G10L 15/18* | (2013.01) |
| *G10L 15/26* | (2006.01) |
| *G10L 15/01* | (2013.01) |
| *G10L 15/06* | (2013.01) |

(52) U.S. Cl.
CPC .......... *G10L 15/18* (2013.01); *G10L 15/1815* (2013.01); *G10L 15/265* (2013.01); *G10L 15/01* (2013.01); *G10L 2015/0631* (2013.01)

(58) Field of Classification Search
CPC .................................................. G10L 15/265
USPC ....................................................... 704/235
See application file for complete search history.

(56) References Cited

U.S. PATENT DOCUMENTS

| | | | |
|---|---|---|---|
| 6,856,957 B1 | 2/2005 | Dumoulin | |
| 7,584,099 B2 * | 9/2009 | Ma | G06F 3/038 704/239 |
| 8,515,736 B1 * | 8/2013 | Duta | G10L 15/1822 704/9 |
| 8,543,401 B2 | 9/2013 | Suendermann et al. | |
| 8,904,309 B1 * | 12/2014 | Zhai | G06F 3/0482 715/773 |
| 9,269,354 B2 | 2/2016 | Gandrabur et al. | |
| 9,361,884 B2 | 6/2016 | Gandrabur et al. | |
| 9,412,365 B2 | 8/2016 | Biadsy et al. | |
| 9,431,008 B2 | 8/2016 | Robichaud et al. | |
| 2006/0025995 A1 * | 2/2006 | Erhart | G10L 15/1822 704/239 |
| 2006/0195321 A1 * | 8/2006 | Deligne | G10L 15/065 704/257 |
| 2006/0230033 A1 * | 10/2006 | Halevy | G06F 17/243 |
| 2008/0033720 A1 | 2/2008 | Kankar et al. | |

(Continued)

OTHER PUBLICATIONS

Dikici et al., "Classification and Ranking Approaches to Discriminative Language Modeling for ASR", IEEE Transactions on Audio, Speech, and Language Processing, vol. 21, Issue 2. Feb. 2013. pp. 291-300.

(Continued)

*Primary Examiner* — Shaun Roberts
(74) *Attorney, Agent, or Firm* — Tutunjian & Bitetto, P.C.; Vazken Alexanian

(57) ABSTRACT

A computer-implemented method for generating an input for a classifier. The method includes obtaining n-best hypotheses which is an output of an automatic speech recognition (ASR) for an utterance, combining the n-best hypotheses horizontally in a predetermined order with a separator between each pair of hypotheses, and outputting the combined n-best hypotheses as a single text input to a classifier.

9 Claims, 11 Drawing Sheets

(56) References Cited

U.S. PATENT DOCUMENTS

| | | | | |
|---|---|---|---|---|
| 2010/0145694 | A1* | 6/2010 | Ju | G10L 15/1815 704/235 |
| 2010/0161334 | A1* | 6/2010 | Kang | G10L 15/10 704/251 |
| 2013/0151250 | A1* | 6/2013 | VanBlon | G10L 15/32 704/235 |
| 2015/0127346 | A1* | 5/2015 | Gruenstein | G10L 15/08 704/254 |
| 2015/0363393 | A1* | 12/2015 | Williams | G06F 17/289 704/8 |

OTHER PUBLICATIONS

Morbini et al., "A Reranking Approach for Recognition and Classification of Speech Input in Conversational Dialogue Systems", 2012 IEEE Spoken Language Technology Workshop (SLT). Dec. 2-5, 2012. pp. 49-54.

Zhai et al., "Using N-best Lists for Named Entity Recognition from Chinese Speech", 2004 NAACL Proceedings. May 2-7, 2004. pp. 1-4.

Zue et al., "Integration of Speech Recognition and Natural Language Processing in the MIT Voyager System", 1991 International Conference on Acoustics, Speech, and Signal Processing. Apr. 14-17, 1991. pp. 713-716.

Google, "word2vec: Google Code Archive—Long-term storage for Google Code Project Hosting Code." Google.com Jul. 2013. pp. 1-7. Available at https://code.google.com/archive/p/word2vec/.

* cited by examiner

INPUT GENERATION FOR CLASSIFIER

BACKGROUND

Technical Field

The present disclosure generally relates to a natural language classifier, and more specifically, to generating an input for the natural language classifier which receives an output from a speech recognizer.

Description of the Related Art

Recently, various natural language classifiers (hereinafter "classifier") are used combined with automatic speech recognition (hereinafter "ASR"). The ASR converts a user utterance into text, the text is fed to the classifier as a query, and the classifier outputs key identification (ID) of an answer or an action to take.

In such a combined system, not only is the accuracy of each component (ASR and classifier) important, but also accuracy of end-to-end performance of the combination is important to applications and users. The total performance is dependent on both accuracies and sometimes unacceptable even if each component is good enough.

SUMMARY

In accordance with an embodiment of the present invention, a computer-implemented method is provided for generating an input for a classifier. The method includes obtaining n-best hypotheses which is an output of an ASR for an utterance, combining the n-best hypotheses horizontally in a predetermined order with a separator between each pair of hypotheses, and outputting the combined n-best hypotheses as a single text input to the classifier.

In accordance with an embodiment of the present invention, a computer program product comprising a computer readable storage medium having program instructions embodied therewith is provided. The computer readable storage medium is not a transitory signal per se. When executed on a computer, the program instructions cause the computer to obtain n-best hypotheses which is an output of an ASR for an utterance, combine the n-best hypotheses horizontally in a predetermined order with a separator between each pair of hypotheses, and output the combined n-best hypotheses as a single text input to the classifier.

In accordance with an embodiment of the present invention, a system/apparatus for generating an input for a classifier is provided. The system/apparatus may include a processor and one or more computer readable mediums. The one or more computer readable mediums collectively comprises instructions that, when executed by the processor, cause the processor to perform obtaining n-best hypotheses which is an output of an ASR for an utterance, combining the n-best hypotheses horizontally in a predetermined order with a separator between each pair of hypotheses, and outputting the combined n-best hypotheses as a single text input to the classifier.

These and other features and advantages of the present invention will be described in, or will become apparent to those of ordinary skill in the art in view of, the following detailed description of the example embodiments of the present invention.

BRIEF DESCRIPTION OF THE DRAWINGS

The following description will provide details of preferred embodiments with reference to the following figures wherein.

DETAILED DESCRIPTION

Figure 1:
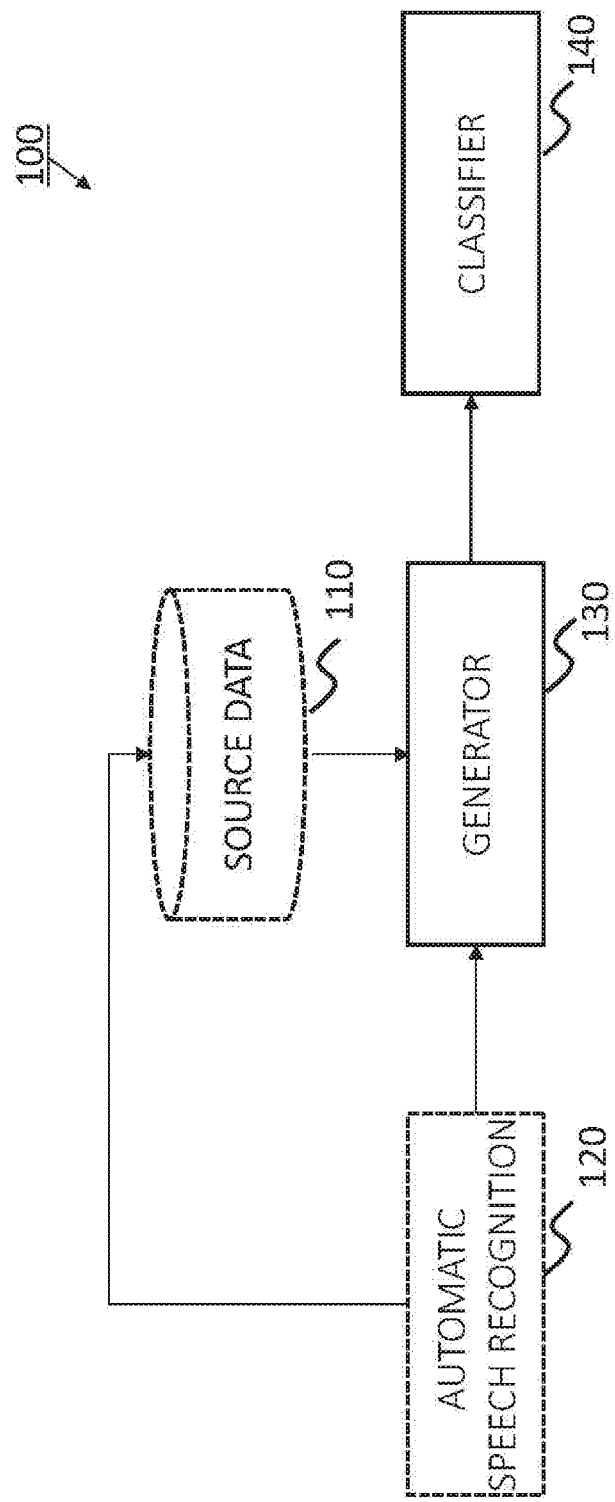
FIG. 1 is a block/flow diagram of a system according to an exemplary embodiment of the present invention.

It should be understood that the present invention is not limited in its application to the details of construction and the arrangement of the components set forth in the following description or illustrated in the drawings. The present invention is applicable to other embodiments or of being practiced or carried out in various ways. Also, it should be understood that the phraseology and terminology employed herein is for the purpose of description and should not be regarded as limiting. As will be appreciated by one skilled in the art, aspects of the present invention may be embodied as a system, method or computer program product.

Hereinafter, referring to the series of FIGS. 1-4, a computer system and method for generating a single text data for a classifier from the n-best hypotheses as an output of an ASR according to an embodiment of the present invention is described. Then, referring to the series of FIGS. 5-7, a computer system and method for generating a training text data for the classifier from a set of the n-best hypotheses as an output of an ASR and a transcription according to an embodiment of the present invention is described. Also, referring to the series of FIGS. 8-10, a computer system and method for generating a training text data for the classifier from m text samples according to an embodiment of the present invention is described. Finally, referring to FIG. 11, a hardware configuration of a computer system according to one or more embodiments of the present invention is described.

Referring now to the drawings in which like numerals represent the same or similar elements and initially to FIG. 1, FIG. 1 shows a system 100 into which one embodiment of the present invention was implemented as a generator 130. During a classification phase, the system 100 may include an ASR 120, a classifier 140 and a generator 130. The ASR 120 and the classifier 140 are combined through the generator 130 according to an embodiment of the present invention.

The ASR 120 receives an utterance and performs speech recognition task to output the n-best hypotheses for the utterance to the generator 130. Where n is any positive integer set on the basis of the experience. The value of n may be fixed or dynamically changed. For example, the value of n may be changed according to confidence scores of the hypotheses. A large value is set for a higher confidence score and a small value is set for a lower confidence score. In the present invention, the maximum value of n is preferably about 10. Any known speech recognition techniques, such as Hidden Markov Models (HMM), Dynamic time warping (DTW)-based speech recognition and neural networks, can be employed.

The generator 130 obtains and processes the n-best hypotheses to output the processed n-best hypotheses as a single text input to the classifier 140. The processing by the generator 130 will be described later in detail with reference to the FIGS. 2-4.

The classifier 140 receives the processed n-best hypotheses as the single text input and performs a classification task to output a classification result for the n-best hypotheses. Any known classification technique, such as decision trees, Support Vector Machines (SVM), and neural networks, can be employed. It should be noted that the training of the classifier 140 with training data generated by the generator 130 described later is required regardless of what the training method corresponding to the selected classification technique is.

As described above, the generator 130 processes n-best hypotheses from the ASR 120 and obtains a single text input for the classifier 140. This makes it possible to leverage the information which n-best hypotheses have to improve the total performance of the system 100 without drawbacks, such as latency and pipeline change, which many previous research works have.

For example, n-best rover, a type of voting approach, is one of the most popular ones (see, L. Thai et al., "Using N-best Lists for Named Entity Recognition from Chinese Speech", NAACL, (2004)). The n-best rover also leverages the n-best hypotheses from an ASR to improve the total performance. However, since the n-best rover uses the n-best hypotheses as n times of input for a classifier, it has drawbacks of latency. Such latency is unacceptable, particularly in cloud environments.

Another approach is to extract features from the n-best hypotheses from an ASR to make a feature vector as an input for a classifier (see, F. Morbini et al., "A Reranking Approach for Recognition and Classification of Speech Input in Conversational Dialogue Systems", IEEE workshop on SLT, (2012) and U.S. Pat. No. 6,856,957). However, this approach has drawbacks of pipeline change because most Natural Language (NL) classifiers are designed for text input and does not accept arbitrary features as an input.

Referring back to FIG. 1, during the training phase, the system 100 may include a source data database 110, the generator 130 and the classifier 140. The database 110 stores source data for training of the classifier 140 which may include a plurality of n-best hypotheses as an output of ASR 120, corresponding transcriptions, and a plurality of text samples.

The generator 130 reads the source data from the database 110 and generates a plurality of inputs as training data for the classifier 140. The processing by the generator 130 will be described later in detail with reference to the FIGS. 5-10.

The classifier 140 receives the generated plurality of inputs as training data. As described above, as for the applied classification and corresponding training method, any known technique can be employed.

Figure 2:
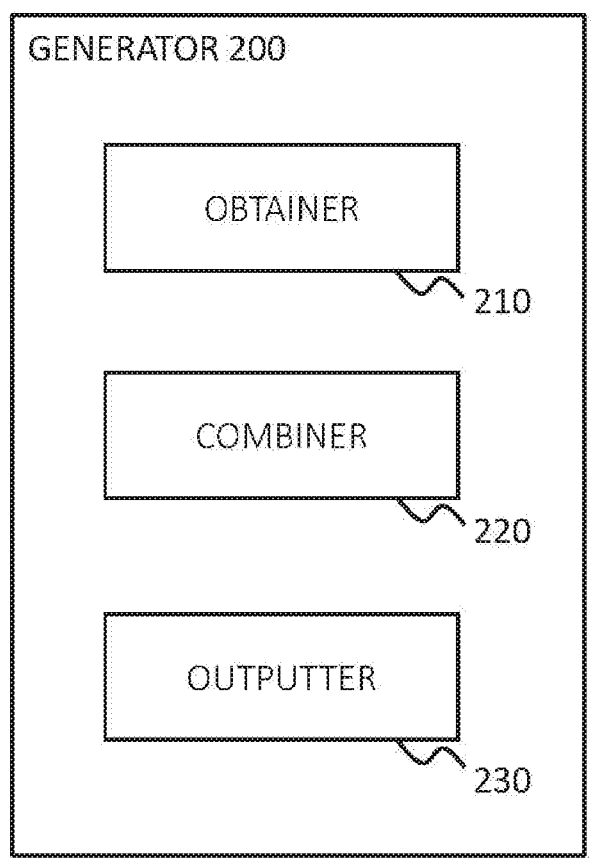
FIG. 2 is a block diagram of a generator in a classification phase, according to an embodiment of the present invention.

With reference now to FIG. 2, FIG. 2 shows a block diagram of a generator 200 during a classification phase, according to an embodiment of the present invention. The generator 200 includes an obtainer 210, a combiner 220 and an outputter 230.

Figure 3:
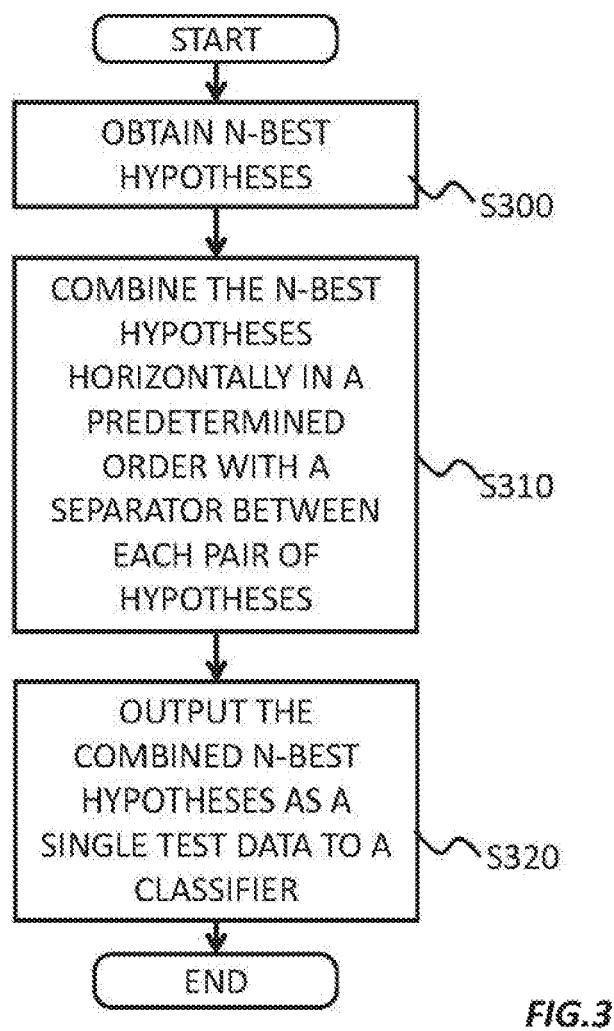
FIG. 3 is a blow/flow diagram depicting a method for generating a single text input, according to an embodiment of the present invention.

The obtainer 210 obtains n-best hypotheses and confidence information which are an output of the ASR 120 for a user utterance (see S300 in FIG. 3). The confidence information includes confidence scores of each hypothesis.

The combiner 220 combines the n-best hypotheses horizontally in a predetermined order with a separator between each pair of hypotheses (see S310 in FIG. 3).

Here, the predetermined order may be an order according to the confidence score of each hypothesis. Both descending order and ascending order are acceptable, but, in any case including an alternative below, the n-best hypotheses have to be in the same order as training data described later.

The alternate predetermined order may be an ascending or a descending order of a difference with the hypothesis with the highest confidence score. The difference may be determined by measuring a distance between each hypothesis and the hypothesis with the highest confidence score. Here, each hypothesis should be in a vector representation before measuring the distance. The conversion may be performed by, for example, but not limited to, using a frequency of word, Term Frequency-Inverse Document Frequency (tf-idf), Latent Semantic Indexing (LSI) or word2vec. In addition, the distance may be calculated by, for example, but not limited to, the cosine similarity. The cosine similarity is a method for measuring similarity between two vectors.

Further, the separator is set in advance according to a classification algorithm of the classifier 140. That is, the separator is the one which the classifier 140 identifies and uses. In many cases, a special symbol, such as "EOS (End Of Sentence)" and "</s>", is used. In addition, when the classifier 140 refers to a wide range more than 3-gram, repeating the special symbol more than once is required (e.g., "hypothesis1 </s></s>hypothesis2 </s></s> . . . ").

The outputter 230 outputs the combined n-best hypotheses as a single text input to the classifier 140 (see S320 in FIG. 3).

Figure 4:
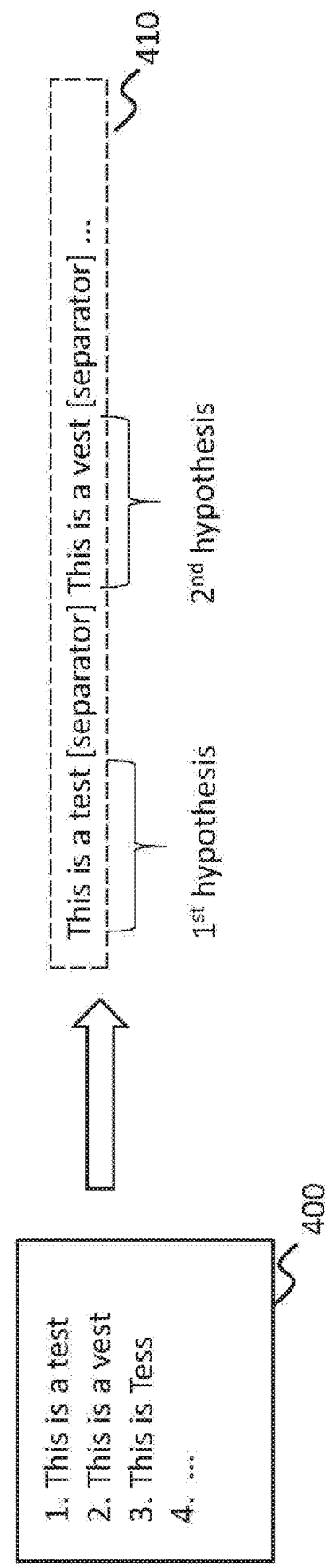
FIG. 4 is a schematic example of a single text input, according to an embodiment of the present invention.

FIG. 4 shows an example of a single text data generated by generator 200, according to an embodiment of the present invention. A list 400 shows the n-best hypotheses listed in a descending order of the confidence score of each hypothesis as an output of the ASR 120. A string 410 shows a single text data as an output of the generator 200. In the string 410, the n-best hypotheses in the list 400 are combined horizontally in the descending order with a separator between each pair of hypotheses. As described above, the separator in the string 410 may be "EOS", "</s>", or other special symbol which the classifier 140 identifies and uses.

Figure 5:
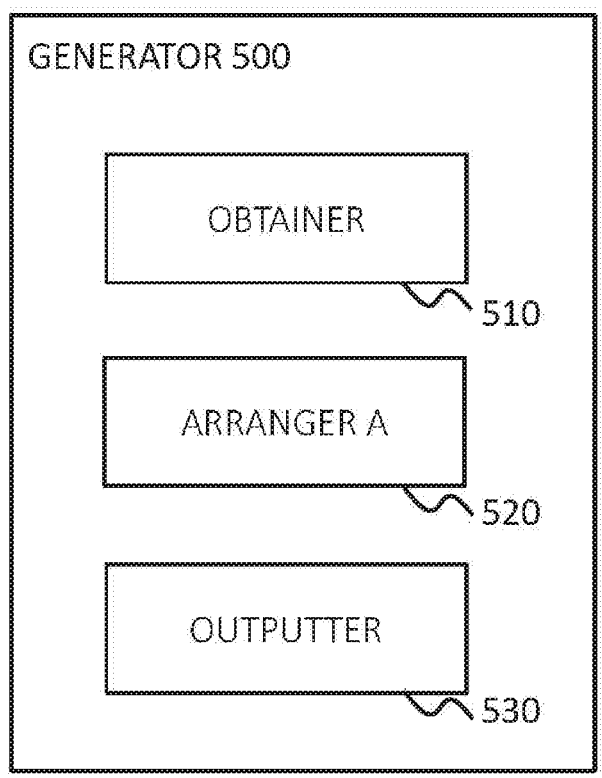
FIG. 5 is a block diagram of a generator in a training phase, according to an embodiment of the present invention.

With reference now to FIG. 5, FIG. 5 shows a block diagram of a generator 500 during a training phase, according to an embodiment of the present invention. The generator 500 includes an obtainer 510, an arranger A 520 and an outputter 530.

Figure 6:
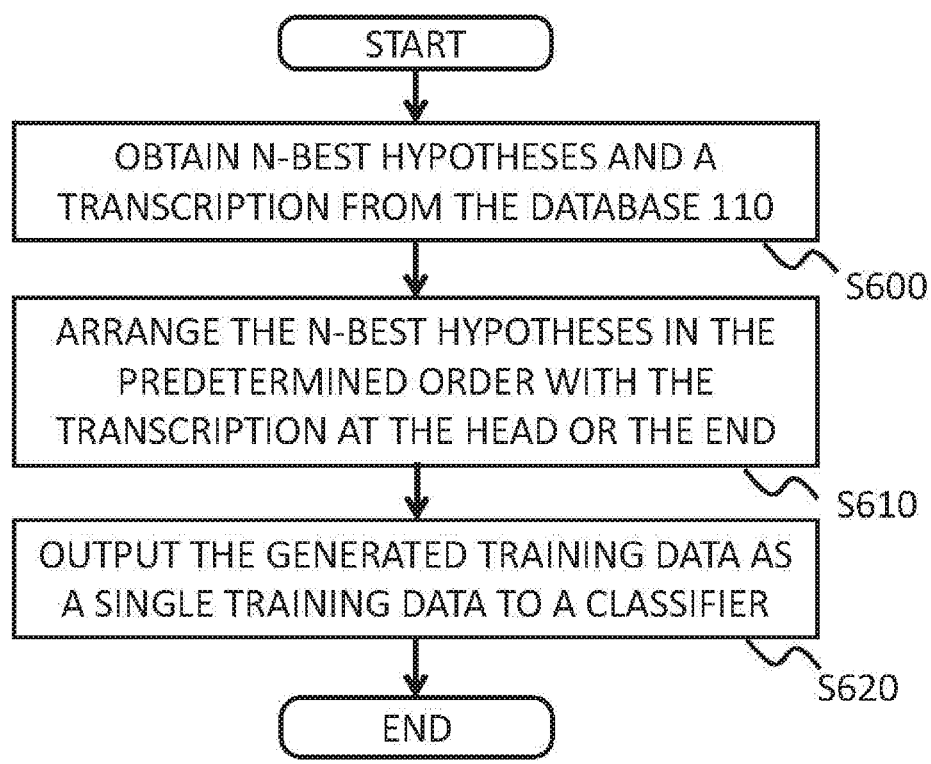
FIG. 6 is a block/flow diagram depicting a method for generating a single training data, according to an embodiment of the present invention.

The obtainer 510 obtains a plurality of sets of n-best hypotheses for an utterance, corresponding confidence information and a corresponding transcription from the source data database 110 (see S600 in FIG. 6). Here, the confidence information includes confidence scores of each hypothesis and the transcription may be a manual transcription.

The arranger A 520 arranges the n-best hypotheses in a predetermined order with the transcription at the head or at the end of the n-best hypotheses depending on the predetermined order (see S610 in FIG. 6).

In a case where the descending order of the confidence score of each hypothesis is employed, the arranger A 520 may arrange the n-best hypotheses in the descending order of the confidence score of each hypothesis with a separator between each pair of hypotheses and add the transcription to the head of the arranged n-best hypotheses. Also, in a case where the ascending order of the confidence score of each hypothesis is employed, the arranger A 520 may arrange the n-best hypotheses in the ascending order of the confidence score of each hypothesis with a separator between each pair of hypotheses and add the transcription to the end of the arranged n-best hypotheses.

Also here, the separator is the one which the classifier 120 identifies and uses. In many cases, a special symbol such as "EOS (End Of Sentence)" and "</s>" is used. The separator is also needed between the transcription and an adjacent hypothesis.

Instead of the order according to the confidence score of each hypothesis, as described above, the order according to difference with the hypothesis with the highest confidence score may be employed.

The outputter 530 outputs the arranged n-best hypotheses with the transcription as a single training data to the classifier 140 (see S620 in FIG. 6).

Figure 7:
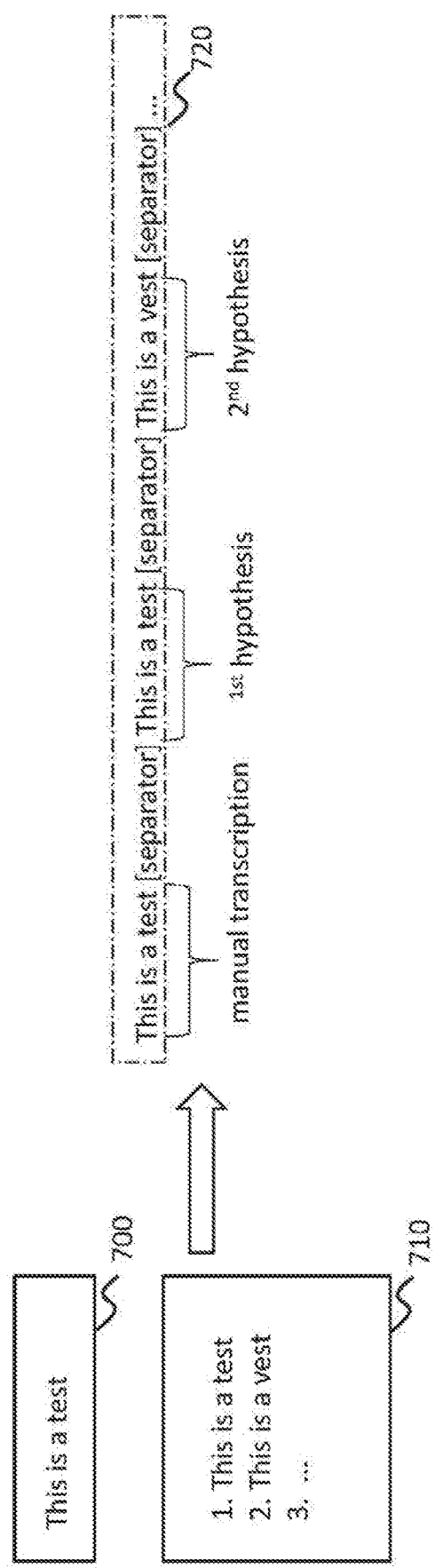
FIG. 7 is a schematic example of a single training data, according to an embodiment of the present invention.

FIG. 7 shows an example of a single training data generated by generator 500, according to an embodiment of the present invention. A file 700 shows a manual transcription of a user utterance. A list 710 shows n-best hypotheses listed in a descending order of the confidence score of each hypothesis as an output of the ASR 120 for the user utterance. A string 720 shows a single training data generated by the generator 500. In the string 720, the n-best hypotheses in a list 710 are combined horizontally in the descending order with the transcription in the file 700 at the head of the combined n-best hypotheses. A separator is set between each pair of hypotheses and between the transcription and the adjacent hypothesis. As described above, the separator in the string 720 may be "EOS", "</s>", or other special symbol which the classifier 140 uses and identifies.

Figure 8:
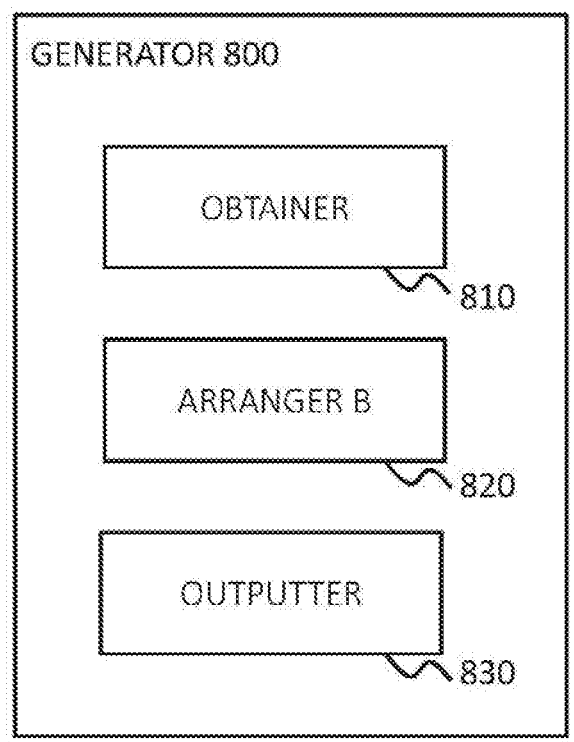
FIG. 8 is a block diagram of a generator in the training phase, according to an embodiment of the present invention.
Figure 9:
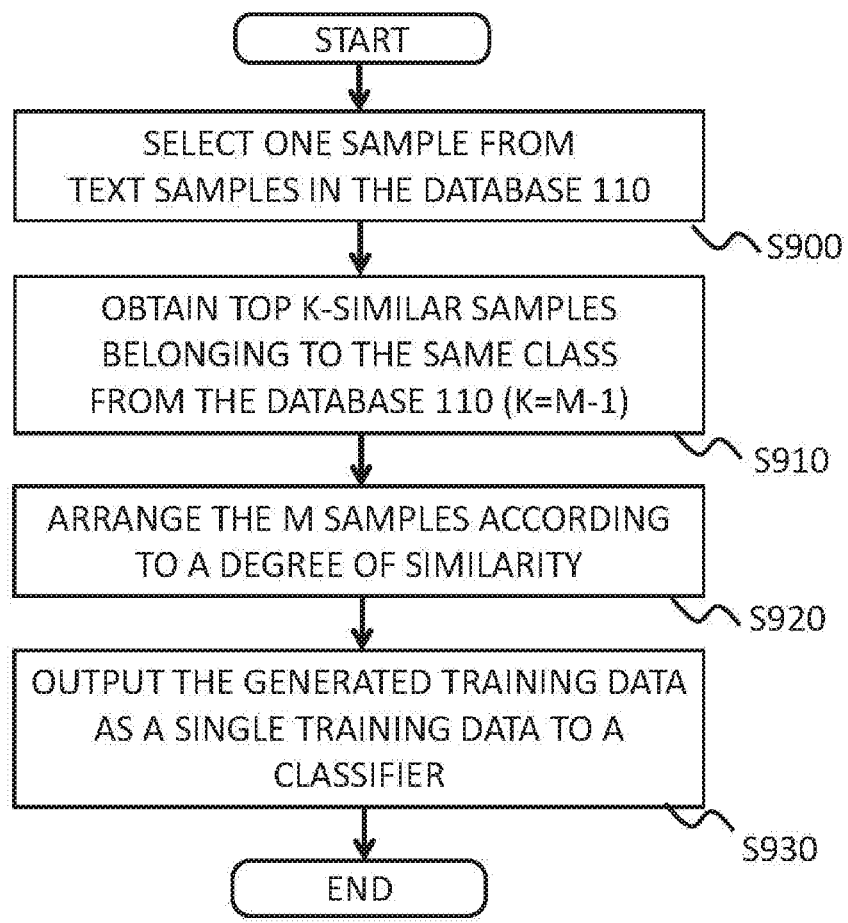
FIG. 9 is a block/flow diagram depicting a method for generating a single training data, according to an embodiment of the present invention.

With reference now to FIG. 8, FIG. 8 shows a block diagram of a generator 800 during a training phase, according to an embodiment of the present invention. The generator 800 includes an obtainer 810, an arranger B 820 and an outputter 830.

The obtainer 810 obtains m text samples which belong to the same class from the source data database 110. More specifically, the obtainer 810 first selects one text sample from text samples in the database 110 (see S900 in FIG. 900). Next, the obtainer 810 obtains top-k similar samples belonging to the same class as the first selected text sample. Where k=m−1 and m is a maximum number of hypotheses obtained from ASR 120 (see S910 in FIG. 900).

Each text sample in the database 110 may be a sentence, a phrase or any portion of a sentence and is related to its own class information. The text samples in the database 110 may be collected in the following manner, as an example. First, prepare a description for each class, then present it to human subject persons and have them write down what they would say in the circumstance. (A sample of description: if you'd like to ask the location of the nearest branch office, what would you say?)

Here, the similarity with the first selected text sample may be determined by measuring a distance between the first selected text sample and each text sample from among text samples belonging to the same class as the first selected text sample. Here, each text sample should be in a vector representation before measuring the distance. The conversion may be performed by, for example, but not limited to, using a frequency of word, Term Frequency-Inverse Document Frequency (tf-idf), Latent Semantic Indexing (LSI) or word2vec. In addition, the distance may be calculated by, for example, but not limited to, the cosine similarity. The cosine similarity is a method for measuring similarity between two vectors.

The arranger B 820 arranges the m text samples according to a degree of the similarity (see S920 in FIG. 900). In one embodiment, the arranger B 820 may arrange the top-k similar samples in descending order of the similarity with the first selected text sample at the head. Instead, the arranger 820 may arrange the top-k similar samples in ascending order of the similarity with the first selected text sample at the end.

The outputter 830 outputs the arranged m text samples as a single training data to the classifier 140 (see S930 in FIG. 900). It should be noted that the classifier 140 may be trained with the single training data from the outputter 830 and/or the single training data from the outputter 530.

Figure 10:
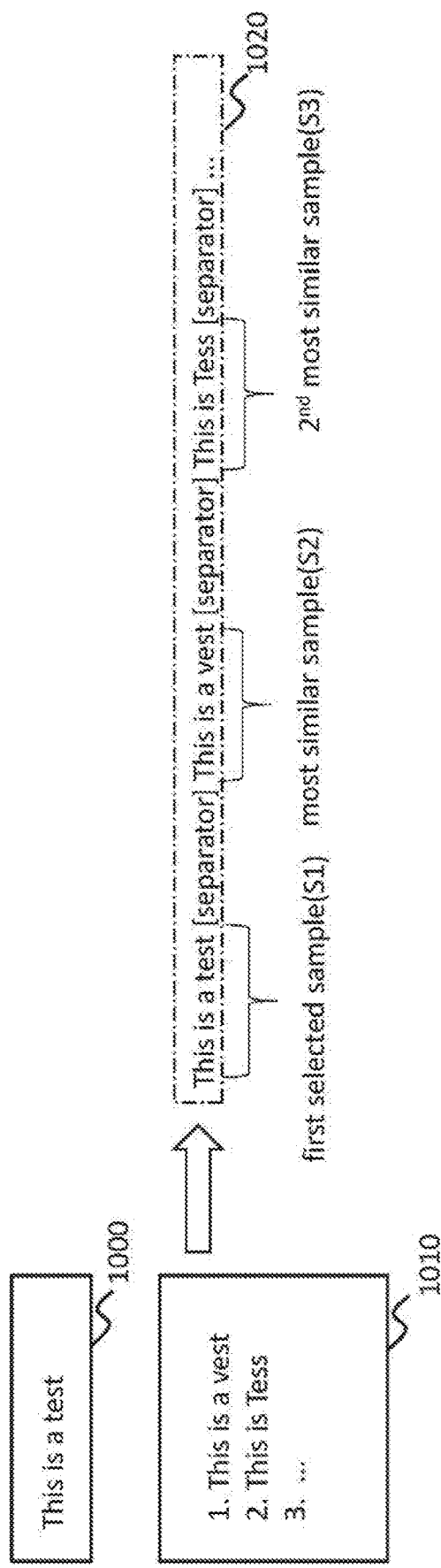
FIG. 10 is a schematic example of a single training data, according to an embodiment of the present invention.

FIG. 10 shows an example of a single training data generated by generator 800, according to an embodiment of the present invention. A text 1000 shows a first selected text sample from the database 110. A list 1010 shows top-k similar samples belonging to the same class as the first selected text sample in a descending order of the similarity. A string 1020 shows a single training data generated by the generator 800. In the string 1020, the first selected text sample is positioned at the head and after that the top-k text samples are arranged in the descending order of the similarity. A separator is set between each pair of text samples. As described above, the separator in the string 1020 may be "EOS", "</s>", or other special symbol which the classifier 140 uses and identifies.

Figure 11:
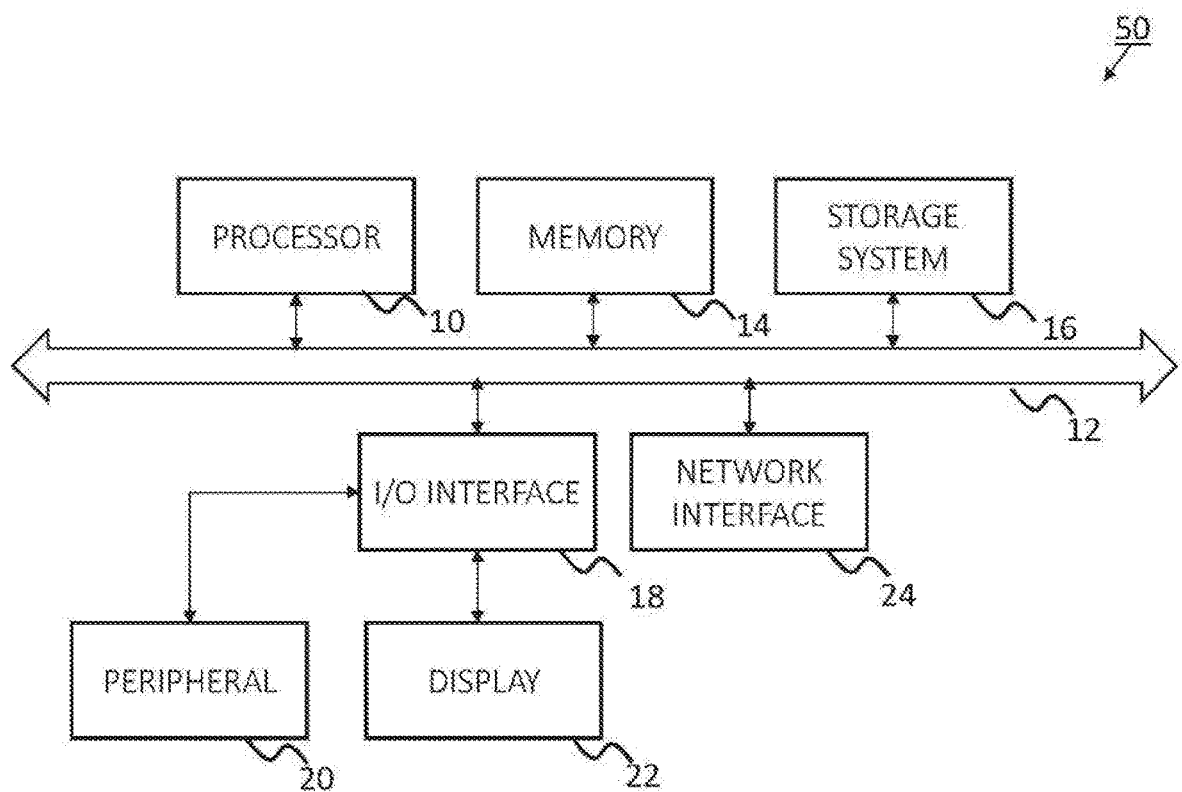
FIG. 11 is a block/flow diagram of a computer system according to one or more embodiments of the present invention.

Referring now to FIG. 11, a schematic of an example of a computer system 50, which can be used for the generators 130, 200, 500 and 800, is shown. The same single computer may be used for the generator 200 in the classification phase and for the generator 500 and/or 800 in the training phase. Instead, a different computer may be used for each of the generator 200, 500 and 800. The computer system 50 shown in FIG. 11 is implemented as a computer system. The computer system 50 is only one example of a suitable processing device and is not intended to suggest any limitation as to the scope of use or functionality of embodiments of the invention described herein. Regardless, the computer system 50 is capable of being implemented and/or performing any of the functionality set forth hereinabove.

The computer system 50 is operational with numerous other general purpose or special purpose computing system environments or configurations. Examples of well-known computing systems, environments, and/or configurations that may be suitable for use with the computer system 50 include, but are not limited to, personal computer systems, server computer systems, thin clients, thick clients, handheld or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 50 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 11, the computer system 50 is shown in the form of a general-purpose computing device. The components of the computer system 50 may include, but are not limited to, a processor (or processing unit) 10 and a memory 14 coupled to the processor 10 by a bus 12 including a memory bus or memory controller, and a processor or local bus using any of a variety of bus architectures.

The computer system 50 typically includes a variety of computer system readable media. Such media may be any available media that is accessible by the computer system 50, and it includes both volatile and non-volatile media, removable and non-removable media.

The memory 14 can include computer system readable media in the form of volatile memory, such as random access memory (RAM). The computer system 50 may further include other removable/non-removable, volatile/non-volatile computer system storage media. By way of example only, the storage system 16 can be provided for reading from and writing to a non-removable, non-volatile magnetic media. As will be further depicted and described below, the storage system 16 may include at least one program product having a set (e.g., at least one) of program modules that are configured to carry out the functions of embodiments of the invention.

Program/utility, having a set (at least one) of program modules, may be stored in the storage system 16 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 50 may also communicate with one or more peripherals 20, such as a keyboard, a pointing device, an audio system, etc.; a display 22; one or more devices that enable a user to interact with the computer system 50; and/or any devices (e.g., network card, modem, etc.) that enable the computer system 50 to communicate with one or more other computing devices. Such communication can occur via Input/Output (I/O) interfaces 18. Still yet, the computer system 50 can communicate with one or more networks such as a local area network (LAN), a general wide area network (WAN), and/or a public network (e.g., the Internet) via the network adapter 24. As depicted, the network adapter 24 communicates with the other components of the computer system 50 via a bus. It should be understood that although not shown, other hardware and/or software components could be used in conjunction with the computer system 50. Examples, include, but are not limited to: microcode, device drivers, redundant processing units, external disk drive arrays, RAID systems, tape drives, and data archival storage systems, etc.

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for improving performance of a speech recognition system, comprising:
    generating a single text data structure for a classifier of a speech recognition system, including:
        obtaining first n-best hypotheses as an output of a speech recognition task performed by automatic speech recognition (ASR) for an utterance received by the speech recognition system; and
        combining the first n-best hypotheses horizontally in a predetermined order with a separator between each pair of n-best hypotheses to generate the single text data structure, wherein each separator is set based on a classification algorithm of the classifier of the speech recognition system as a symbol that is usable by the classifier of the speech recognition system; and
    outputting the single text data structure as an input to the classifier to perform a classification task;
    wherein the classifier is trained to perform the classification task based on a single training text data structure by:
        obtaining source training data including a plurality of second n-best hypotheses and a transcription for each utterance from a database;
        arranging the source training data with the transcription at a head or at an end of the second n-best hypotheses depending on the predetermined order to generate the single training text data structure; and
        outputting the single training text data structure to the classifier.

2. The method according to claim 1, wherein each of the first and second n-best hypotheses is associated with a corresponding confidence score, and wherein the predetermined order is determined based on the confidence scores.

3. The method according to claim 1, wherein each separator is selected from the group consisting of: EOS and </s>.

4. An apparatus comprising:
    a processor; and
    one or more non-transitory computer readable storage mediums collectively including instructions that, when executed by the processor, cause the processor to perform a method for improving performance of a speech recognition system, the method comprising:
    generating a single text data structure for a classifier of a speech recognition system, including:
        obtaining first n-best hypotheses as an output of a speech recognition task performed by automatic speech recognition (ASR) for an utterance received by the speech recognition system; and
        combining the first n-best hypotheses horizontally in a predetermined order with a separator between each pair of n-best hypotheses to generate the single text data structure, wherein each separator is set based on a classification algorithm of the classifier of the speech recognition system as a symbol that is usable by the classifier of the speech recognition system; and outputting the single text data structure as an input to the classifier to perform a classification task;

wherein the classifier is trained to perform the classification task based on a single training text data structure by:

obtaining source training data including a plurality of second n-best hypotheses and a transcription for each utterance from a database;

arranging the source training data with the transcription at a head or at an end of the second n-best hypotheses depending on the predetermined order to generate the single training text data structure; and outputting the single training text data structure to the classifier.

5. The apparatus according to claim 4, wherein each of the first and second n-best hypotheses is associated with a corresponding confidence score, and wherein the predetermined order is determined based on the confidence scores.

6. The apparatus according to claim 4, wherein each separator is selected from the group consisting of: EOS and </s>.

7. A computer program product comprising a computer readable storage medium having program instructions embodied therewith, wherein the computer readable storage medium is not a transitory signal per se, the program instructions executable by a computer to cause the computer to perform a method for improving performance of a speech recognition system, the method comprising:

generating a single text data structure for a classifier of a speech recognition system, including:

obtaining first n-best hypotheses as an output of a speech recognition task performed by automatic speech recognition (ASR) for an utterance received by the speech recognition system; and combining the first n-best hypotheses horizontally in a predetermined order with a separator between each pair of n-best hypotheses to generate the single text data structure, wherein each separator is set based on a classification algorithm of the classifier of the speech recognition system as a symbol that is usable by the classifier of the speech recognition system; and outputting the single text data structure as an input to the classifier to perform a classification task;

wherein the classifier is trained to perform the classification task based on a single training text data structure by:

obtaining source training data including a plurality of second n-best hypotheses and a transcription for each utterance from a database;

arranging the source training data with the transcription at a head or at an end of the second n-best hypotheses depending on the predetermined order to generate the single training text data structure; and outputting the single training text data structure to the classifier.

8. The computer program product according to claim 7, wherein each of the first and second n-best hypotheses is associated with a corresponding confidence score, and wherein the predetermined order is determined based on the confidence scores.

9. The computer program product according to claim 7, wherein each separator is selected from the group consisting of: EOS and </s>.

* * * * *